United States Patent [19]
Marzocchi et al.

[11] Patent Number: 6,105,740
[45] Date of Patent: Aug. 22, 2000

[54] HYDRAULIC SHOCK ABSORBER

[75] Inventors: Paolo Marzocchi, Bologna; Loris Vignocchi, Zola Predosa; Sandro Musiani, Marzabotto, all of Italy

[73] Assignee: Marzocchi S.p.A., Lavino di Zola Predosa, Italy

[21] Appl. No.: 09/121,073

[22] Filed: Jul. 21, 1998

[30] Foreign Application Priority Data

Jul. 23, 1997 [IT] Italy .................................. BO97A0449

[51] Int. Cl.⁷ ...................................................... F16F 9/54
[52] U.S. Cl. ........................ 188/322.2; 188/298; 188/314
[58] Field of Search ............................. 188/266.6, 322.2, 188/314, 313, 298, 281; 267/64.16, 64.15, 64.11, 64.23, 64.28

[56] References Cited

U.S. PATENT DOCUMENTS

| | | | |
|---|---|---|---|
| 4,311,302 | 1/1982 | Heyer et al. | 267/64.23 |
| 4,732,244 | 3/1988 | Verkuylen | 188/314 |
| 4,834,088 | 5/1989 | Jeanson | 188/281 |
| 5,988,332 | 11/1999 | Marzocchi et al. | 188/322.2 |

*Primary Examiner*—Christopher P. Schwartz
*Assistant Examiner*—Mariano Sy
*Attorney, Agent, or Firm*—King and Schickli, PLLC

[57] ABSTRACT

The compensator is made separately from the cylinder of the shock absorber, and the two parts are prearranged for the reciprocal coupling with the possibility of articulation around said cylinder and/or around an axis, substantially perpendicular or orthogonal to the axis of the shock absorber itself.

8 Claims, 2 Drawing Sheets

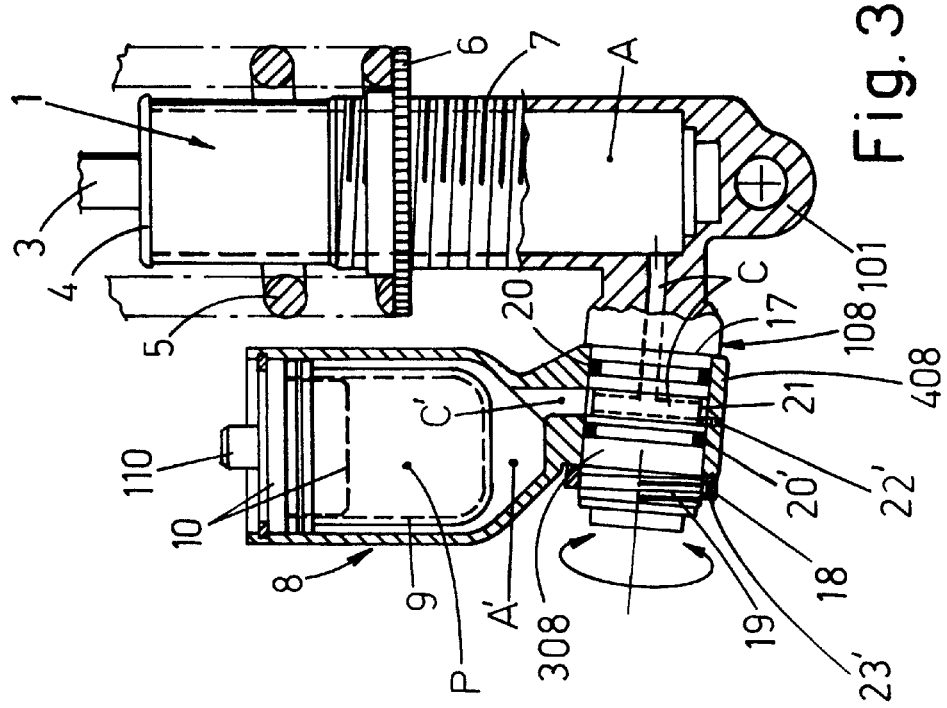
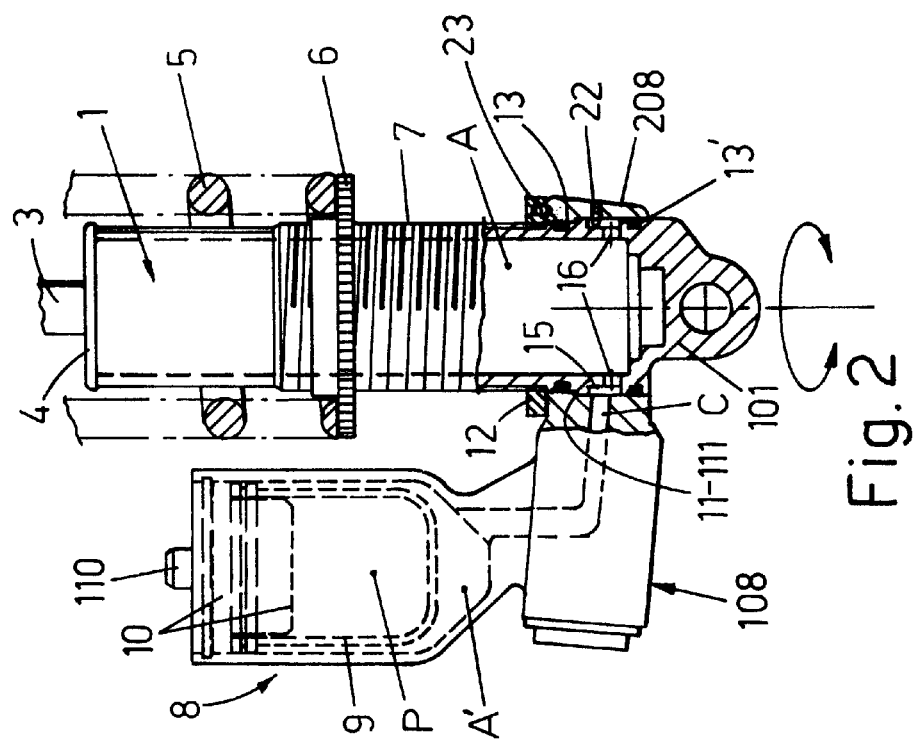

HYDRAULIC SHOCK ABSORBER

DESCRIPTION

The present invention relates to hydraulic shock absorbers which are used singularly or in combination with others for the manufacture of forks for bikes and motorbikes, said shock absorbers being made up of a cylinder, closed at one end, such end being connected to the first point of the mechanism which has to be cushioned, said cylinder containing a piston which runs with lateral seal and which is integral with a stem coming, with lateral seal, out of the bushing which closes the other end of the said cylinder and which, with its outside end, is connected to the second point of the said mechanism which has to be cushioned. One of the inside chambers of the shock absorber is connected to the so-called compensator, composed of a chamber with changing volume, defined by a piston or by a diaphragm and whose volume increase is contrasted by an elastic means, usually a pressurised gas. The compensator allows the shock absorber to work with the inside chambers full of liquid, since it absorbs and then releases the liquid excesses which cannot be exchanged between the said inside chambers by means of the valve means, usually placed on the piston of the shock absorber itself.

In the shock absorbers of the known type, when the compensator is placed laterally to the shock absorber itself, the compensation chamber is usually obtained as one piece with the cylinder of the shock absorber itself. What follows is that the compensator is placed in a fixed and predetermined position in relation to the shock absorber, so that the latter cannot even be fitted up when the compensator would interfere with a component of the bike or motorbike. The present invention aims at eliminating this disadvantage with the following solution idea. The compensator is made separately from the cylinder of the shock absorber and the two parts are prearranged for the reciprocal coupling, with the possibility of being articulated around the cylinder of the shock absorber and/or around an axis, substantially perpendicular or orthogonal to the axis of the shock absorber itself.

Other features of the invention, and the advantages deriving from them, will be evident from the following description of a preferred form of embodiment of the invention shown by way of example in the figures of the attached drawings, in which:

FIGS. 2 and 3 show that part of the absorber which is connected to the compensator, respectively in the embodiment which allows the compensator to turn around the shock absorber and in the embodiment which allows the compensator to turn around an axis which is perpendicular, or substantially perpendicular, or orthogonal to the absorber axis.

Figure 1:
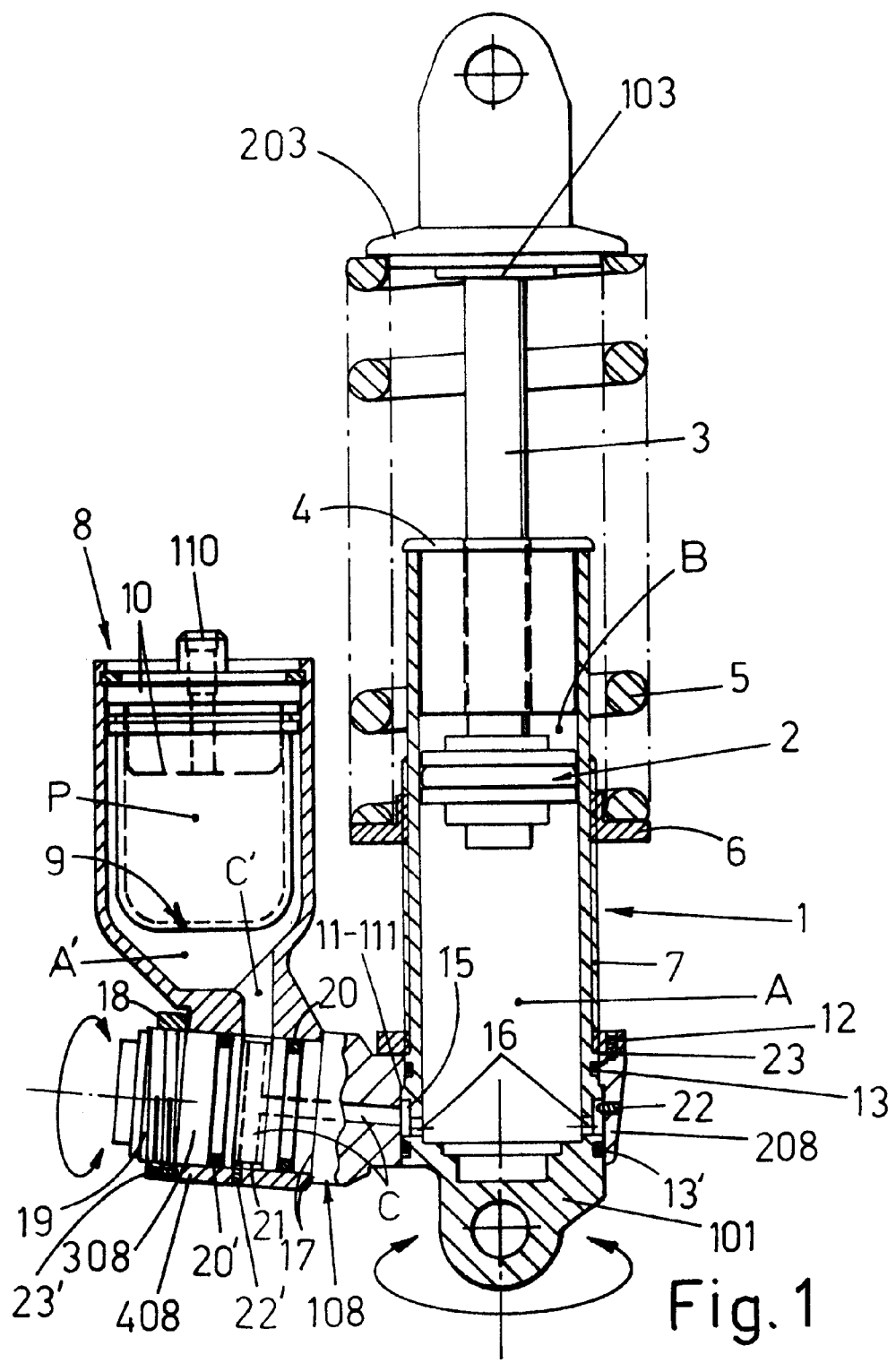
FIG. 1 shows the shock absorber sectioned according to a plane containing both the axis of the absorber itself and the axis of the compensator, the two parts being prearranged so as to turn on two axes which are substantially reciprocally perpendicular or orthogonal.

In FIG. 1, the numeral 1 indicates the cylindrical body or the cylinder of the shock absorber, closed on end 101, said end being prearranged for the connection to one of the points of the mechanism which has to be cushioned, in said cylinder running with lateral seal the piston 2 which is integral with the stem 3, which crosses with lateral seal the bushing 4 sealing the cylinder 1 on its other end. The end 103 of the stem is prearranged for the connection to the second point of the mechanism which has to be cushioned, and the stem itself is usually stressed in extension by a spring 5 operating, on one side, on a cup of end 203 of the stem itself, and on the other, abutting on a ring 6 which is screwed onto an outside threaded portion 7 of the cylinder 1. A and B indicate the inside chambers, respectively with larger and smaller active section of the absorber (due to the stem 3 in the chamber B), both filled with liquid. The piston 2 usually has valve means, in some cases adjustable by means of a device axially crossing the stem 3, such device being accessible to be operated from the end 103 of the stem itself. These means, which make it possible to suit the working of the shock absorber to the different use demands, are not considered here since they have no bearing on the comprehensive area of the present invention.

The chamber of the compensator 8, placed laterally to the cylinder 1, has its inside volume divided into two parts, for instance by means of a flexible diaphragm 9, the chamber indicated with A' being full of oil and communicating with the chamber A of the shock absorber, while the chamber P is closed by means of a plug 10 equipped with valve means 110 which allow to introduce some gas under a suitable pressure into the chamber P itself. While the shock absorber is working, the chamber A' of the compensator absorbs and releases the liquid excesses of the chamber A of the absorber itself, while the gas pressure in the chamber P creates an elastic component which is added to the one of the spring 5. In the lower extension 108, which, with its opening C, connects the compensator to the cylinder 1, are in some cases provided adjustable valves means, such means checking the flow of liquid between the chambers A and A' and allowing to suit the working of the shock absorber to the different use demands. These means, too, are not considered here since they have no bearing on the area of comprehension of the present invention.

In a shock absorber of the type described above or of an equivalent type, for example with a piston instead of the diaphragm 9 and with an adjustable spring instead of the gas pressure in the chamber P, the present invention aims at providing the following improvement. The compensator 8 is made separately from the cylinder 1 and the two parts are prearranged so as to be assembled with the usual relative disposition, but in such a way that the compensator can be turned around the cylinder 1 and can be blocked in the most suitable angular position and/or that the compensator 8 can be turned around the extension 108 connecting the cylinder and can be blocked in the most suitable position.

According to a preferred form—though not the only one—of embodiment of the present invention (see FIGS. 1 and 2), the extension 108 connecting the compensator to the shock absorber is equipped jointly to one end with a bushing 208, with a round section inside, which is prearranged in order to be fitted onto the cylinder 1 with fairly good precision, to stop on the lower end of the cylinder for the cooperation of its ledge 11 with a correspondent ledge 111 of the cylinder itself, said bushing being blocked in the desired angular position by means of at least one fixing ring 12 which is screwed onto the threaded portion 7 of the cylinder. The cylinder portion which is defined by the bushing 208 is equipped with at least one pair of ring-shaped recesses housing corresponding seals 13–13' which operate with lateral seal with said bushing and in the space between these two seals, the cylinder 1 itself is equipped with an outside ring-shaped recess 15 which, through at least one hole 16, is connected to chamber A. The opening C of the extension 108, connecting the chamber A with A', ends in the said ring-shaped recess 15.

It is evident how, by loosening the ring 12, it is possible to turn the compensator assembly around the axis of the cylinder 1 so as to bring it to the most suitable position where it may be blocked by rescrewing said ring.

In combination with or instead of the said possibility of variable positioning of the compensator, it may be provided that the said extension 108 connecting the compensator to the cylinder 1, ends on the compensator side with a cylindrical portion with outside round section 308, onto which a bushing 408, integral with the body of the compensator itself 8, may be fitted with enough precision, though with the possibility of turning. The aforesaid portion 308 is, for instance, tapered in comparison with the remaining portion of the extension 108, so as to form a ring-shaped step 17 against which said bushing 408 abuts, and is blocked in the desired angular position by means of at least one ring 18 which is screwed onto a threaded portion 19 of said portion 308. On the extension portion 308, which is covered by the bushing 408, at least two ring-shaped recesses are provided, said recesses being engaged by corresponding seals 20–20', which operate sealingly with said bushing 408 and, between these recesses, another ring-shaped recess 21 is provided, where, on one side, and the opening C linked to chamber A of the shock absorber, and on the other side, ends the opening portion C' linked to chamber A' of the compensator.

The present invention, as described here, can be modified as follows. The rings 12 and 18 are preferably equipped with respective threaded holes with anti-loosening grub screws 23, 23'. An alternative to these means the said rings can be provided by respective blocking counter-rings. Another variations can relate to the fact that the rings 12 and 18 can operate on the respective bushings 208 and 408 with the interposition of an elastic washer or a cup spring or of another elastic means. In order to avoid an unsuitable use of the adjustments, means may be provided to prevent that the bushings 208 and 408 move axially in an undesired way. These means, for instance, can include respective grub screws 22 and 22' which are seal-screwed into corresponding radial holes of the aforesaid bushings and which partially engage the ring-shaped recesses 15 and 21.

What is claimed is:

1. Hydraulic shock absorber with a variable volume compensator for a vehicle, comprising:

a cylinder sealed at one end for connection to a first part of the vehicle, said cylinder including first and second pressure chambers;

a stem for attachment to a second part of the vehicle including a piston slidably engaged within said cylinder between said first and second pressure chambers means for connecting the second pressure chamber with the variable volume compensator for absorbing and releasing the liquid excesses which cannot flow from the second chamber to the first chamber, characterized in that the compensator is separate from the cylinder and reciprocally connected thereto with the possibility of cylindrical articulation such that the compensator can turn around an axis of the cylinder and can be blocked in a desired angular position, and such that the compensator itself can turn around an axis of an extension forming a part of said connecting means connecting the cylinder to the compensator;

said connecting means including a first and second plurality of ring-shaped recesses, at least one of said first and second recesses having at least one opening forming a duct system that connects the compensator to the second pressure chamber, and sealing means being provided in at least one pair of said first and second recesses to avoid any liquid leakage from the said duct system.

2. Shock absorber according to claim 1, wherein the extension connecting the compensator to the cylinder of the absorber itself carries a first bushing, cylindrical inside, that is fitted onto said cylinder with the possibility of turning, said first bushing including a ledge for engaging a step of the cylinder itself and which is blocked axially onto this step and prevented from turning by at least one first fixing ring screwed onto an outside threaded portion of said cylinder, the cylinder portion engaged by said first bushing having at least two of said first ring-shaped recesses engaged by corresponding seals which operate sealingly with said first bushing, and between said at least two first ring-shaped recesses, a separate first ring-shaped recess having said at least one opening connecting the second pressure chamber to the compensator.

3. Shock absorber according to claim 2, wherein the compensator includes a body having a chamber and carrying a second bushing, cylindrical inside, fitted onto the extension connecting the compensator to the cylinder, with the possibility of turning, said second bushing abutting against a step of said extension and being blocked axially onto this step and prevented from turning by at least one second fixing ring screwed on a threaded portion of said extension, with a portion of the extension engaged by said second bushing further including at least two of said second ring-shaped recesses, each engaged by a corresponding seal that operates sealingly with said second bushing, and between the at least two second ring-shaped recesses, a separate second ring-shaped recess in fluid communication with the chamber in the compensator and in which the opening connecting the second pressure chamber to the compensator ends.

4. Shock absorber according to claim 3 wherein said first and second fixing rings are equipped with anti-loosening grub screws screwed into corresponding threaded holes in the respective first and second bushings.

5. Shock absorber according to claim 4 wherein an elastic means is interposed between each of said first and second fixing rings and said respective first and second bushings.

6. Shock absorber according to claim 3 wherein a means for preventing undesired axial displacement of the said first and second bushings when the the corresponding first and second fixing rings arc excessively loosened, is provided.

7. Shock absorber according to claim 6, wherein said first and second bushings each include at least one radial hole for receiving a respective grub screw or plug, said grub screw or plug at least partially extending into the corresponding separate first ring-shaped recess and the separate second ring-shaped recess.

8. A hydraulic shock absorber for a vehicle, comprising:

a cylinder sealed at one end for connection to a first part of the vehicle, said cylinder including first and second pressure chambers each filled with a liquid;

a stem for attachment to a second part of the vehicle including a piston slidably engaged within said cylinder;

a variable volume compensator for absorbing and releasing any excess liquid flowing from the second chamber;

means for connecting said variable volume compensator to the cylinder, said connecting means keeping the compensator separate from the cylinder and allowing for rotation about or articulation relative to a central axis thereof, as well as rotation around an extension forming a part of the connecting means;

said connecting means further including a plurality of ring-shaped recesses, at least one of said recesses having an opening for allowing liquid to pass from the compensator to the cylinder and the remaining recesses each carrying sealing means to prevent any liquid from leaking therefrom.

\* \* \* \* \*